United States Patent Office 3,097,239
Patented July 9, 1963

3,097,239
CONDENSATION PRODUCTS OF TRINITROMETHANE AND DIMETHYLOLUREA
Pliny O. Tawney, Passaic, N.J., assignor to United States Rubber Company, New York, N.Y., a corporation of New Jersey
No Drawing. Filed Nov. 24, 1948, Ser. No. 61,922
5 Claims. (Cl. 260—553)

My invention concerns certain novel nitrogen-containing compounds and a method for preparing same. Specifically, I have unexpectedly discovered that nitroform, i.e., trinitromethane, will react with N,N'-dimethylolurea to yield two new compounds, which are believed to be the N-2,2,2-trinitroethyl-N'-hydroxymethylurea and the N,N'-bis(2,2,2-trinitroethyl)urea respectively. The probable course of the reaction is as follows:

(1)
HO—CH$_2$—NH—CO—NH—CH$_2$OH + H—C(NO$_2$)$_3$ ⟶

(NO$_2$)$_3$C—CH$_2$—NH—CO—NH—CH$_2$OH

↓ + H—C(NO$_2$)$_3$ (NO$_2$)$_3$C—CH$_2$—NH—CO—NH—CH$_2$—C(NO$_2$)$_3$

It is believed that the compounds of the present invention conform to the formula,

R—CH$_2$—NH—CO—NH—CH$_2$—C(NO$_2$)$_3$ where R is a group selected from the class of hydroxyl and trinitromethyl. It is evident that products having this last formula contain within themselves substantially enough oxygen for their complete combustion. This is quantitatively calculated from the following conventional formula:

$$\left(O - 2C - \frac{1}{2}H\right)\frac{1600}{MW}$$

where O, C, and H are, respectively, the number of oxygen, carbon and hydrogen atoms in the compound of molecular weight MW. The value obtained from the preceding formula is called the "oxygen balance."

Both of these new compounds are comparatively high-melting crystalline solids which are stable at temperatures up to their melting point but which can be detonated by mechanical shock. Hence my new compounds are especially suitable as explosives and for use in explosive mixtures particularly since their thermal stability lessens the hazards inherent in the handling and processing of many such explosives and they undergo little or no loss in potency, even on long storage.

The reaction of my invention can be carried out at moderate temperatures, e.g. 25–75° C. by mixing the dimethylolurea with the trinitromethane, preferably in molar ratios of from 1:1 to 1:5, and preferably in the presence of hydroxylic solvents e.g., lower alkanols such as methanol, ethanol and aqueous mixtures thereof, if desired. The feasibility of using such alcoholic solvents emphasizes the novelty of my invention, since while the hydroxyl groups of such alcohols undergo no reaction with trinitromethane under these conditions, my reaction, involving the hydroxyl groups of dimethylolurea, proceeds with unexpected ease. Conventional buffers may be employed if desired to ensure optimum control of the pH of the reaction mixture.

The new compounds of my invention can be readily isolated from the above reaction mixtures by preferential extraction or by fractional crystallization.

While the product obtained by bringing together the dimethylolurea and the trinitromethane is frequently a mixture of the two compounds disclosed herein, it is possible by appropriate adjustment of the ratio of the initial reactants to secure a major proportion of either compound. Thus, by using molar ratios of the reactants in the neighborhood of 1:1 it is possible to obtain a major proportion of the compound believed to be (NO$_2$)$_3$C—CH$_2$—NH—CO—NH—CH$_2$OH while by employing a relatively large amount of trinitromethane in the initial reaction mixture, it is possible to obtain a major proportion of the compound believed to be (NO$_2$)$_3$C—CH$_2$—NH—CO—NH—CH$_2$—C(NO$_2$)$_3$ Also I may prepare the first compound just mentioned and convert it to the second compound, as is illustrated in Example 2 below.

The following examples disclose my invention in more detail. All parts are by weight.

Example 1

To a stirred mixture of 15 parts of distilled water and 1.80 parts of N,N'-dimethylolurea at about 25° C. is added a mixture of 3.02 parts of trinitromethane and about 12.0 parts of 95% aqueous ethanol. At the end of about 1.5 hours a finely-divided precipitate settles out of the yellow solution and the reaction is allowed to proceed for an additional 4.5 hours at about 25° C. The reaction mixture is then filtered and the precipitate is washed with a minimum volume of distilled water and air dried. This product, amounting to 2.7 parts, melts at ca. 180–183° C. and after recrystallization from methanol it melts at ca. 183–4° C. (uncorrected). This crystalline material detonates upon being struck with a hammer. Oxygen balance=−22.

*Analysis.*—Found: C, 18.57%; H, 2.32%; N, 27.55%.
Theory (C$_4$H$_7$O$_8$N$_5$) C, 18.97%; H, 2.76%; N, 27.66%.

Example 2

Five tenths part of the above product is heated at 40° C. for 12 hours with a solution of 1.0 part of nitroform in about 7.9 parts of methanol. At the end of this time about 4.0 parts of methanol are added. The solution is warmed to 55° C. and water is added until the solution becomes faintly turbid. Upon cooling this solution 0.45 part of product separate as gleaming white needles which, after drying, melt at 189–190° C. (uncorrected). These crystals detonate sharply when struck by a hammer and retain their potency even after storage for several weeks. Oxygen balance=zero.

*Analyses.*—Found: C, 15.30%; H, 1.53%; N, 27.98%.
Theory (C$_5$H$_6$O$_{13}$N$_8$) C, 15.55%; H, 1.56%; N, 29.01%.

The above compound can also be isolated in minor amounts from the reaction mixture of Example 1.

I claim:
1. A compound selected from the group consisting of

(NO$_2$)$_3$C—CH$_2$—NH—CO—NH—CH$_2$OH and (NO$_2$)$_3$C—CH$_2$—NH—CO—NH—CH$_2$—C(NO$_2$)$_3$ 2. A compound having the formula (NO$_2$)$_3$C—CH$_2$—NH—CO—NH—CH$_2$OH 3. A compound having the formula (NO$_2$)$_3$C—CH$_2$—NH—CO—NH—CH$_2$—C(NO$_2$)$_3$ 4. A process which comprises commingling dimethylolurea and trinitromethane at a temperature of from 25°

C. to 75° C. and recovering from the resulting reaction mixture a compound selected from the group consisting of $$(NO_2)_3C-CH_2-NH-CO-NH-CH_2OH$$

and $$(NO_2)_3C-CH_2-NH-CO-NH-CH_2-C(NO_2)_3$$

5. A process as set forth in claim 4 wherein said reactants are commingled in a lower alkanol reaction medium.

References Cited in the file of this patent
UNITED STATES PATENTS

| | | |
|---|---|---|
| 2,279,765 | Spaeth | May 14, 1942 |
| 2,383,603 | Larrison et al. | Aug. 28, 1945 |

OTHER REFERENCES

Bebie: Manual of Explosives, Military Pyrotechnics and Chemical Warfare Agents, the MacMillan Co., New York (1943), pp. 3–7 inclusive.